United States Patent [19]

Evans

[11] 4,355,121

[45] Oct. 19, 1982

[54] HEAT STRENGTH CURABLE SILICONE RUBBER COMPOSITIONS

[75] Inventor: Edwin R. Evans, Clifton Park, N.Y.

[73] Assignee: General Electric Company, Waterford, N.Y.

[21] Appl. No.: 252,659

[22] Filed: Apr. 9, 1981

[51] Int. Cl.$^3$ .............................................. C08L 83/06
[52] U.S. Cl. .............................. 523/213; 204/159.13; 524/500; 525/477
[58] Field of Search ........................ 525/477; 523/213; 524/500; 204/159.13

[56] References Cited

U.S. PATENT DOCUMENTS

| | | | |
|---|---|---|---|
| 3,179,619 | 4/1965 | Brown | 260/37.5 B |
| 3,660,345 | 5/1972 | Bobear | 260/37.5 B |
| 3,730,932 | 5/1973 | De Zuba et al. | 260/29.15 B |
| 4,041,010 | 8/1977 | Jeram | 525/477 |

Primary Examiner—Wilbert J. Briggs, Sr.
Attorney, Agent, or Firm—E. Philip Koltos

[57] ABSTRACT

A high strength heat curable silicone rubber composition comprising (A) 100 parts of a vinyl-terminated diorganopolysiloxane base polymer having up to 0.7 weight percent of aliphatic type unsaturation such as 3,3-difluor-2-propenyl from 5 to 80 parts by weight of a vinyl-terminated diorganopolysiloxane additive polymer having from 0.05 to 10 mole percent of organo vinylsiloxy units and from 0.01 to 10 parts by weight of a curing catalyst.

35 Claims, No Drawings

HEAT STRENGTH CURABLE SILICONE RUBBER COMPOSITIONS

BACKGROUND OF THE INVENTION

The present invention relates to heat curable silicone rubber compositions and more particularly the present invention relates to flourosilicone heat curable silicone rubber compositions.

Heat curable silicone rubber compositions are well known. Generally such compositions comprise a diorganopolysiloxane gum having a viscosity varying from 1,000,000 to 300,000,000 centipoise at 25° C., optionally a filler which is preferably a silica filler and a curing catalyst. The curing catalyst preferably is a peroxide catalyst. In the composition, there should be preferably utilized a polysiloxane process aid which facilitate the mixing of the filler in the diorganopolysiloxane gum and prevent it from structuring. There may be utilized other additives in the compositions such as heat flame retardant additives, heat aging additives, and self-bonding additives such as the self-bonding additives disclosed in De Zuba et al. U.S. Pat. No. 3,730,932 which is hereby incorporated by reference. An example of flame retardant additive is a platinum additive of Nobel et al. U.S. Pat. No. 3,514,424 which is hereby incorporated by reference.

It should be noted that a diorganopolysiloxane gum preferably contains some alkenyl groups which are preferably vinyl groups so as to ease the cross-linking and curing of the polymer. Fluorosilicone substituted heat curable silicone rubber compositions are also well known as disclosed in Brown U.S. Pat. No. 3,179,619. Other such compositions are produced by taking fluorosilicone substituted cyclopolysiloxane and heating them at elevated temperatures in the presence of an alkali metal hydroxide catalyst which is preferably potassium hydroxide in the presence of small amounts of chain-stoppers which may be water or low molecular silanol terminated diorganopolysiloxane polymers or may be aliphatic alcohol chain-stoppers, see for instance the disclosure of Bluestein Ser. No. 170,272. Such polymers are also disclosed to be produced with low molecular weight vinyl terminated chain-stoppers as for instance disclosed in the Patent Application of E. Robert Evans Ser. No. 071,152, filed Aug. 30, 1979, abandoned which is hereby incorporated by reference.

It should be noted that all the foregoing Patent Applications and Patents disclosed in this document are incorporated by reference in the present case. Thus utilizing a low molecular weight vinyl terminated fluorosilicone substituted copolymer as a chainstopper which is reacted in the presence of a sodium hydroxide catalyst with a fluoro substituted cyclotrisiloxane, it was possible to obtain diorganopolysiloxane gums of high molecular weight in a period of time varing anywhere from 3 minutes to 4 hours.

As disclosed in the copending case of Evans Ser. No. 253,282 filed Apr. 9, 1981 it was possible to obtain diorganopolysiloxane gums of a high viscosity, a viscosity varying from anywhere from 1,000,000,000 to 300,000,000 centipoise at 25° C. where the 3,3-difluoro-2-propenyl or aliphatic unsaturation does not exceed 0.70 weight percent. It was found in such gums where the aliphatic unsaturation does exceed 0.7 weight percent that the resulting silicone elastomer formed from such gums had good strength properties and especially high tear. It was also possible to utilize the process of the foregoing patents to produce flurosilicone copolymers in which the aliphatic type unsaturation did not exceed 0.70 weight percent. This was done by controlling the amount of unsaturation that was present in the cyclotrisiloxane that was utilized in the process by first controlling the amount of unsaturation that was formed in the cyclotrisiloxane by the process by which it was made, and also but not utilizing batches of cyclotrisiloxanes in which the vinyl unsaturation exceeds 0.70 weight percent.

It was possible to produce fluorosilicone substituted copolymers which were vinyl terminated by equilibrating fluoro substituted cyclotrisiloxanes with octaorganotetrasiloxanes in the presence of an alkali metal hydroxide catalyst at elevated temperatures, that is temperatures above 140° C. There was produced a copolymer having from 5 to 40 mole percent of trifluoropropyl substituted groups. The method of producing these copolymers is disclosed in the copending Patent Application of Evans et al. Ser. No. 253,282 filed Apr. 9, 1981. These copolymers have had many desirable properties and produce addition cured compositions with good strength properties.

The base homopolymer as well as the copolymer were tested for utilization on gas masks. In the past, gas masks had been produced from a timethylsilicone polymer in which the lens was formed from transparent plastic and in which the frame supporting the lens as well as the straps was formed from a dimethylpolysiloxane gum. However, it was necessary to coat the dimethylpolysiloxane gum frame with various types of fluorosilicone compositions and coatings so as to make the frame impervious to nerve gas.

Dimethylpolysiloxanes are not impervious to nerve gas. However the complicated coating procedure that was utilized tended to increase the cost of the mask.

Accordingly it was highly desirable to produce the frame and the straps of the gas masks from a fluorisilicone composition of the proper impervious ability to nerve gas at a lower cost. The foregoing vinyl terminated fluorosilicone homopolymers and copolymers were tested for this application. However, it was found that they do not have as high strength properties as would be desired although they do indeed have good strength properties.

Accordingly it was highly unexpected by including two vinyl terminated polymers with a dramatically different vinyl-on-chain concentration that there could be obtained exceptionally high strength fluorosilicone heat curable silicone rubber compositions. It should be noted that high strength high vinyl blends of diorganopolysiloxane gums to produce nonfluoronated heat curable silicone rubber compositions are disclosed in Bobear U.S. Pat. No. 3,660,345. However the present fluorosilicone compositions were not known prior to the present time.

It is one object of the present invention to provide for a high strength fluoro substituted heat curable silicone rubber composition.

It is another object of the present invention to provide for a high strength heat curable silicone rubber composition which is produced by blending diorganopolysiloxane gums of different vinyl-on-chain concentrations.

It is yet an additional object of the present invention to provide a process for producing a vinyl terminated high organo vinylsiloxy fluoro substituted copolymer of a viscosity varying from 1,000,000 to 300,000,000 centipoise at 25° C.

It it still an additional object of the present invention to provide a process for producing a high strength fluoro substituted heat curable silicone rubber composition.

It is a further object of the present invention to provide a gas mask in which the frame of the mask and the straps are formed from a high strength fluoro substituted heat curable silicone rubber composition which is impervious to gases. These and other objects of the present invention are accomplished by means of the disclosure set forth herein below.

SUMMARY OF THE INVENTION

In accordance with the above objects there is provided by the present invention, a high strength heat curable silicone rubber composition comprising (A) 100 parts by weight of a vinyl terminated diorganopolysiloxane base polymer having a viscosity varying from 1,000,000 to 300,000,000 centipoise at 25° C. where the organo groups are selected from a mixture fluoroalkyl groups and monovalent hydrocarbon radicals wherein the aliphatic type unsaturation is 0.7 weight percent or less; (B) from 5 to 80 parts by weight of a vinyl terminated diorganopolysiloxane additive polymer having a viscosity varying from 1,000,000 to 300,000,000 centipoise at 25° C. where the organo groups are a mixture of fluoroalkyl radicals and monovalent hydrocarbon radicals wherein the vinyl-on-chain content of the additive polymer varies from 0.05 l to 10 mole percent of organo vinylsiloxy units which were derived through copolymerization with methylvinylsiloxy cyclic trimer; and (C) from 0.1 to 10 parts by weight of a curing catalyst. Preferably in the present composition, there is also incorporated from 5 to 200 parts by weight of a filler which is most preferably a silica filler selected from fumed silica or precipitated silica.

There may also be present in the composition from 2 to 30 parts by weight of a process aid which is preferably a non-fluorinated process aid. In addition to these ingredients, there may self-bonding additives and other additives commonly associated with heat curable silicone rubber compositions. The basis of the present invention lies in the blending of two vinyl terminated fluorosilicone substituted polymers and copolymers in which in the base polymer the aliphatic type unsaturation does not exceed 0.7 weight percent and in which the additive polymer, the vinyl-on-chain unsaturation varies from 0.05 to 10 mole percent of organo vinylsiloxy units in the molecule.

It should be noted that the polymer can be a homopolymer in which there is 50 mole percent of 3,3,3 trifluoropropyl substituted groups in the polymer or it can be a copolymer so that the trifluoropropyl substituted group concentration varies from 5 to 40 mole percent. It should be noted that there may be some silanol groups in either polymer or in both polymers, although such silanol groups should be preferably be kept below 0.1 weight percent. Such silanol groups may be present as a result of the incomplete line of the cyclopolysiloxane that was utilized in and the reaction to produce the gum. However, preferably, there are no silanol groups in the cyclopolysiloxanes which are utilized.

In addition to the above, there is within the scope of the present invention, a process for producing a fluoropropyl substituted vinyl terminated polysiloxane gum which is a copolymer which has a concentration of 0.05 to 10 mole percent of organo vinylsiloxy units in the polymer.

DESCRIPTION OF THE PREFERRED EMBODIMENT

The basic polymer is a heat curable silicone rubber composition and comprises a vinyl terminated diorganopolysiloxane base polymer having a viscosity varying from 1,000,000 to 300,000,000 centipoise at 25° C. and more preferably having a viscosity varying from 15,000,000 to 300,000,000 centipoise at 25° C. where the organo groups are selected from a mixture of fluoroalkyl groups and monovalent hydrocarbon radicals where the aliphatic unsaturation is 3,3-difluor-2-propenyl unsaturation on the polymer and generally does not exceed 0.70 weight percent and more preferably does not exceed 0.40 weight percent. The organo groups other than the fluoroalkyl groups can be any monovalent hydrocarbon radicals such as alkyl radicals of 1 to 8 carbon atoms, cycloalkyl radicals, such as cyclohexyl, cycloheptyl, mononuclear aryl radicals, such as phenyl, methylphenyl etc. and alkenyl radicals such as vinyl. However as noted before, the amount of unsaturation in the polymer chain cannot exceed 0.7 weight percent and preferably does not exceed 0.4 weight percent. Preferably there is no vinylmethylsiloxy units present. However due to the method for preparation of the polymer, there is present some aliphatic unsaturation such as 3,3-difluor-2-propenyl unsaturation which is preferably kept at the levels indicated above. Preferably, the organo groups, other than fluoroalkyl, are selected from methyl and phenyl and more preferably are methyl. In addition preferably the fluoroalkyl group is 3,3,3 trifluoropropyl.

The base polymer can either be a homopolymer that is composed of 100 mole percent or close to 100 mole percent of orgao or alkyl trifluoropropyl siloxy units with the exception of the terminal groups or it can be a copolymer where there is present from 10 to 80 mole percent and more preferably from 20 to 40 mole percent of alkyl such as methyl, trifluoropropyl siloxy units in the polymer.

Preferably the base polymer has the formula,

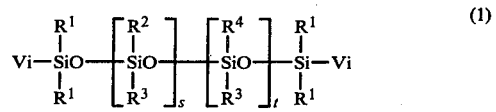

(1)

wherein Vi is vinyl, R² is fluoroalkyl radical of 3 to 8 carbon atoms and more preferably 3,3,3 trifluoropropyl, R¹ and R³ are monovalent hydrocarbon radicals such as alkyl radicals, phenyl radicals and cycloalkyl radicals of 1 to 8 carbon atoms and are most preferably methyl. The radical R⁴ is is selected from monovalent hydrocarbon radicals and fluoralkyl radicals and s and t vary such that the base polymer has a viscosity varying from 15,000,000 to 300,000,000 centipoise at 25° C. and wherein the unsaturated dihalogenated hydrocarbon group-on-chain does not exceed 0.7 weight percent and preferably does not exceed 0.4 weight percent. Most preferably R² is trifluoropropyl and R¹, R³ are alkyl radicals of 1 to 8 carbon atoms or phenyl. In case the base compound of formula 1 is a copolymer then the alkyl trifluoropropyl siloxy units varies from 10 to 80 mole percent in the polymer. Most preferably it varies from 20 to 40 mole percent. Also within the scope of the present invention is when $R^2$ is 3,3,3 trifluoropropyl whereupon the polymer of Formula (1) is a homopolymer. It should be noted that the polymer of Formula (1) whether a copolymer or homopolymer may contain less than 0.01 weight percent of silanol groups. These silanol groups result in the polymer as a result of water or trace amounts of silanol type chain-stopping impurities being present in the cyclotrisiloxane that is utilized to produce the polymer.

It should be noted that preferably there is no water at all in the reactants such that the polymer of Formula (1) does not have any silanol. However this may be difficult to carry out.

A small amount of water or silanol type chain-stopping impurities will not affect the properties of a final composition. The polymer of Formula (1) is obtained by reacting cyclotrisiloxane containing alkyl and trifluoropropyl substituent groups in the presence of small amounts of an alkali metal hydroxide catalyst and preferably a sodium hydroxide catalyst in the presence of certain vinyl terminated chain-stoppers.

Preferably the cyclotrisiloxane does not contain a aliphatic type unsaturation concentration that exceeds 0.7 weight percent in the total cyclotrisiloxane reactant. The chainstopper can be any of two types and is more preferably, a chainstopper as defined in Evans Patent Application, Ser. No. 071,152 abandoned which is hereby incorporated by reference. The chainstopper is formed in accordance with the process of the foregoing Patent Application and it comprises forming a low molecular weight vinyl terminated polymer which in one case has 30 to 40 repeating dimethylsiloxy units and 20 to 30 repeating methyl 3,3,3 trifluoropropyl siloxy repeating units. In the other situation, the chainstopper can be a chainstopper containing vinyl terminal units with about 20 repeating dimethylsiloxy units. It should be noted that in place of methyl, there can be any other alkyl radical of 1 to 8 carbon atoms and in place of 3,3,3 trifluoropropyl there can be any fluoroalkyl radical of 3 to 8 carbon atoms.

With these chainstoppers in the appropriate amount, the cyclotrisiloxane and the sodium hydroxide catalyst is heated at a temperature of at least 140° and more preferably at a temperature of 140° to 180° C. for 30 minutes to 1 hour to produce the hompolymer. If it is desired to produce a copolymer, then the alkyl trifluoropropyl cyclotrisiloxane is reacted in the appropriate amounts with a 1,3,5,7-tetramethyl-1,3,5,7-tetravinylcyclotetraiclooxane or more preferably 1,3-trimethyl-1,3,5-trivinylclotrisiloxane in the presence of the same amounts of alkali metal hydroxide catalyst such as sodium hydroxide at the same temperature range for 30 minutes to 6 hours. In the reaction with only the cyclotrisiloxane, the cyclotrisiloxane reacts quickly to form the diorganopolysiloxane gum in a period of time varying from 30 minutes to 60 minutes with the maximum amount of the desired polymer being formed in about 30 minutes or slightly over 30 minutes. With respect to the case where a copolymer is formed having more than 10 weight percent of another cyclo tri or tetrasiloxane, it is necessary to equilibrate them into the reaction mixture with the cyclotrisiloxane so as to produce a copolymer and this results in the reaction being a equilibration reaction taking place in 4 to 6 hours where about 20 percent of the cyclotrisiloxane and the cyclotetrasiloxane are being converted to the linear polymer at maximum conversion. The rest of the cyclics, that is 8–20 percent or so of cyclics, remain a cyclic and are stripped off to be reused or disposed of as is desired. After the equilibration reaction is over in the case of the copolymer or the polymerization reaction in case of the cyclotrisiloxane by itself, the polymer mixture is neutralized with a silyl phosphate so as the neutralize the alkyl metal hydroxide catalyst, then the cyclics are stripped off and the polymer filtered to remove salts so as to yield the desired polymer which as stated previously may be homopolymer or a copolymer.

It should be noted that as a result of the process by which it is made, that is by utilizing cyclotrisiloxane that does not exceed 0.7 weight percent of aliphatic unsaturation such as alkenyl such as vinyl or 3,3-difluor-2-propenyl type aliphatic unsaturation, there results a fluorosilicone base polymer which can be either homopolymer or copolymer in which the aliphatic type unsaturation does not exceed 0.7 weight percent and more preferably does not exceed 0.4 weight percent.

It should be noted that the aliphatic unsaturation is controlled in the cyclotrisiloxane by using a cyclotrisiloxane that had been produced that contains an aliphatic unsaturation that does not exceed the above level and also by controlling the preparation of the cyclotrisiloxane such that it does not contain aliphatic unsaturation or vinyl unsaturation beyond the level indicated above. The manner in which this is done is explained in the copending docket of Evans Ser. No. 253,282 filed Apr. 9, 1981 which had been referred to previously and which is hereby incorporated by reference. In addition more details as to the preparation of such vinyl terminated base polymers which have low aliphatic unsaturation content in accordance with the above limits are disclosed in the foregoing Evans Docket which is hereby incorporated by reference.

Now proceeding to the second vinyl terminated polymer, per 100 parts by weight of the base vinyl terminated diorganopolysiloxane polymer there is utilized from 5 to 80 parts by weight of a vinyl terminated diorganopolysiloxane additive polymer having a viscosity varying from 1,000,000 to 300,000,000 at 25° C. where the organo groups are a mixture of fluoroalkyl radicals and monovalent hydrocarbon radicals where the vinyl-on-chain content of the additive polymer varies from 0.05 to 10 mole percent of organo vinylsiloxy units. The polymer, that is the additive polymer; preferably has a viscosity varying from 15,000,000 to 300,000,000 centipoise at 25° C. The fluoroalkyl groups which is preferably 3,3,3 trifluoropropyl, can be any fluoroalkyl group of 3 to 8 carbon atoms.

The other organo groups can be any organo groups such as alkyl radicals of 1 to 8 carbon atoms, cycloalkyl radicals of up to 8 carbon atoms, mononuclear aryl radicals, such as phenyl, methylphenyl etc. and alkenyl radicals such as vinyl. As a matter of fact, there has to be vinyl present not only in the vinyl terminating positions of the polymer chain but also vinyl-on-chain. Specifically, 0.05 to 10 mole percent of diorganosiloxy units have to be vinyl organo units where the organo group can be any of the groups mentioned previously. The organo groups are preferably selected from alkyl radicals of 1 to 8 carbon atoms and phenyl and are most preferably, methyl. In the additive polymers or copolymers the organo vinyl groups in the vinyl-on-chain content of the additive polymer preferably varies from 0.3 to 10 mole percent. Preferably the additive polymer has the formula,

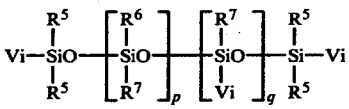

where in Formula (2), Vi is vinyl, $R^5$ is a monovalent hydrocarbon radical and is preferably an alkyl radical or methyl, $R^6$ is a fluoroalkyl radical of 3 to 8 carbon atoms and preferably 3,3,3 trifluoropropyl, $R^7$ is selected from the class consisting of alkyl radicals and phenyl and is preferably methyl and p and q vary such that the viscosity of the polymer varies from 15,000,000 to 300,000,000 centipoise at 25° C. and the mole percent of $R^7$, Vi SiO units varies from 0.05 to 10 mole percent in the polymer. More preferably the concentration of p and q vary such that the units taking q times varies from 0.3 to 7 mole percent in the polymer.

It is necessary to have this vinyl copolymer in the compositions of the instant case to get the high strength properties as disclosed previously. Such a polymer is produced by reacting a cylcotrisiloxane of the formula,

wherein $R^f$ is a fluoroalkyl radical of 3 to 8 carbon atoms and most preferably 3,3,3 trifluoropropyl and $R^{10}$ is a radical selected from the class consisting of alkyl radicals, vinyl and phenyl and is preferably alkyl radicals of 1 to 8 carbon atoms, with a cyclotrisiloxane of the formula,

where Vi is vinyl, $R^{11}$ is a radical selected from the class of alkyl and phenyl radicals and is preferably an alkyl radical of 1 to 8 carbon atoms such as methyl, with a vinyl chainstopper in the presence of alkali metal hydroxide catalyst.

Preferably, the vinyl chainstopper is a vinyl terminated low molecular weight polymer which is prepared and is disclosed in the foregoing Evans, Ser. No. 071,152 which is hereby incorporated by reference. Preferably the vinyl terminated chainstopper is a copolymer of dialkylsiloxy units and alkyl trifluoropropyl-siloxy units and it is most preferably a vinyl terminated low molecular weight polymer having about 30 to 40 dimethylsiloxy units and 20 to 30 methyltrifluoropropylsiloxy units. Preferably sufficient amounts of this chainstopper are utilized to produce the desired polymer with the desired viscosity. The more chainstopper that there is utilized, the lower the viscosity of the final polymer or gum. The less amount of chainstopper that is utilized, the higher the molecular weight and viscosity of the resulting polymer and gum. Preferably there is utilized from 4,000 to 50,000 parts per million of chainstopper.

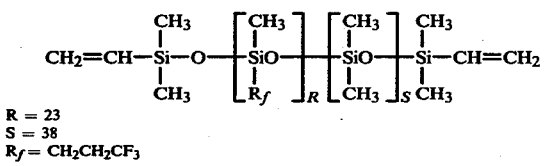

R = 23
S = 38
$R_f = CH_2CH_2CF_3$

Other vinyl terminated low molecular weight fluorosilicone copolymers may be utilized as chainstoppers. However, the preferred one is the one disclosed above. The preferred alkali metal hydroxide catalyst is sodium hydroxide and is desirably present at a concentration of anywhere from 5 to 200 parts per million and more preferably at a concentration of anywhere from 5 to 50 parts per million. Preferably there is no water or silanol present in the reaction mixture. However, if the cyclotrisiloxanes are not dried completely, there may be tolerated less than 0.1 weight percent of water or silanol groups in the reaction mixture. However, silanol content in the reaction mixture should not exceed this level, otherwise the properties of the final polymer and the cured elastomer are affected. More preferably there is no silanol groups or water in the reaction mixture. However, if there is less than 0.1 weight percent of silanol groups or water in the reaction mixture, then this will not markedly affect the final properties of the heat curable silicone rubber composition. The time of the reaction which is not an equilibration reaction but a non-equilibration polymerization reaction, may be anywhere from 30 minutes to 2 hours and is most preferably from 30 minutes to 60 minutes wherein the reaction temperature varies from 140° to 180° C.

Accordingly after 30 minutes or so when there is about 97 percent conversion of the cyclics to the polymer, the catalyst is neutralized preferably with a silyl phosphate and the remaining cyclics are stripped off so that the final polymer has less than 1.0 percent by weight of voltiles in it. The resulting polymer is then ready for utilization or blending with the base vinyl terminated polymer to produce a high strength heat curable silicone rubber composition.

Per 100 parts of the base polymer, there may be present from 0.1 to 10 parts by weight of a curing catalyst. Preferably, the curing catalyst is an organic peroxide.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

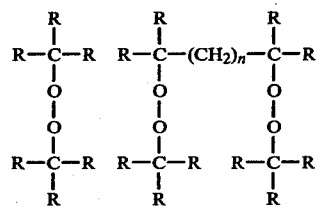

wherein R represents the same alkyl group throughout or alkyl groups of two or more different types and n is zero or a larger integer.

Amount the specific peroxide curing catalysts that are preferred are di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. Other suitable peroxide catalysts which effect curing through saturated as well as unsaturated hydrocarbon groups on the silicone chain are aryl peroxides which include benzoyl peroxides, mixed alkyl-aryl peroxides which include tertiary-butyl perbenzoate, chloralkyl peroxides such as 1,4-dichlorobenzoyl peroxide; 2,4-dichlorobenzoyl peroxide, monochlorobenzoyl peroxide, benzoyl peroxide, etc. Generally 0.1–10 parts by weight of said peroxide per 100 parts of polydiorganosiloxane gum is used to cure the silicone rubber composition and referably 0.5–3.0 parts by weight. Of the above curing catalyst, t-butyl perbenzoate, is preferred. Any of the foregoing peroxides may be utilized in the present invention but the following are preferred: 2,5-dimethyl-2,5-di(t-butylperoxy)hexane, 2,5-dimethyl-2,5-di(t-butylperoxy)hexyne-3, dicumpyperoxide, bis(2,5-diaklorobezoyl)peroxide, and alpha, alpha bis(t-butylperoxy)-diisopropylbenzene.

In addition to the curing peroxide, there may be per 100 parts of the base polymer, from 5 to 200 parts by weight of a filler. The filler is preferably selected from a class consisting of fumed silica and percipitated silica and mixtures thereof and is more preferably fumed silica. Most preferably the concentration of silica filler is from 5 to 100 parts by weight. Extending fillers can be employed alone or in combination with the preferred fillers with good results. Such filler material are extending fillers, such as titanium oxide, iron oxide, aluminum oxide as well as the inorganic filler materials known as inert fillers which can include along others diatomaceous earth, calcium carbonate and quartz. It can be preferably be employed in combination with a highly reinforcing silica fillers to improve the tensile strength or the hardness of the elastomer product. Other examples of suitable fillers are diatomaceous silica, alunimum silicate, zinc oxide, zirconium silicate, barium sulfate, zinc sulfide, aluminum silicane and finely divided silica having surface-bonded alkoxy groups.

In the silica filler, there is preferably treated with cyclopolysiloxanes as disclosed in Lucas U.S. Pat. No. 2,938,009 or with silizanes as disclosed in Smith U.S. Pat. No. 3,635,743 hereby incorporated by reference. Most preferably there is utilized a fluorosiloxane to treat the filler as disclosed in Matsomato Ser. No. 195,579 which is hereby incorporated by reference. In addition to the filler treatment, there may be utilized process aids in the composition. Such process aids reducing the tendency of the composition to structure. Accordingly, there may be utilized from 2 to 30 parts by weight of a process aid. Preferably the process aid is a non-halogenated compound and preferably non-fluorondated compound which is a diorganopolysiloxane having a viscosity varing from 100,000 to 10,000,000 at 25° C. where the organo groups are selected from alkyl radicals, vinyl radicals, phenyl radicals and mixtures thereof and in which the vinyl concentration varies from 5 to 25 weight percent. This is the most preferred process aid.

Another process aid that can be utilized at the same concentration is a non-halogenated polysiloxane compound of $R_2SiO$ and $RSiO_{1.5}$ units and having a viscosity in the range of 5 to 10,000 centipoise at 25° C. and a silanol content varying from 0.1 to 5 percent by weight where R is selected from the class consisting of alkyl radicals of 1 to 3 carbon atoms, phenyl, vinyl and mixtures thereof and more preferably being selected from methyl phenyl and vinyl radicals. Examples of this process aid and more details as to the production and use is to found in the Patent of Simpson U.S. Pat. No. 4,089,833 which is hereby incorporated by reference.

Other additives that may be incorporated into the composition are 0.25 to 10 parts by weight of a self-bonding additive. Accordingly the self-bonding additive may be selected from the class consisting of silyl maleates, silyl fumerates, silyl phthalates, silyl isocyanurates, silyl cyanurates and mixtures thereof and other suitable self-bonding additives. Disclosure of such self-bonding additives is to be found in De Zuba et al. U.S. Pat. No. 3,730,932 which is incorporated by reference. The isocyanurate self-bonding additives are disclosed in U.S. Pat. No. 3,773,819 which is hereby incorporated by reference. There may be added other additives to the composition such as flame retardant additives, heat compression additives, heat aging additives etc.

The heat curable composition is prepared by mixing the two vinyl terminated polymers and then adding preferably a filler treated or not treated as desired with the necessary amount of process aids. The resulting mixture can be mixed either in a dough mixer or in a Banbury, stripping off the voltiles that are given off as the mixture is formed to homogenous mixture. The mixing time can vary anywhere from 5 to 24 or more hours especially in a dough mixer. When the composition is formed into a homogenous mass, then it is strained to remove dirt and cut up into the necessary sections.

It may then be taken and there may be incorporated into it the necessary amount of curing catalyst or it may be sold without the curing catalyst. The fabricator may take the composition and mill it so as to plasticize it and then add to it the necessary amount of the curing catalyst. At any rate after the curing catalyst has been added to the composition and the composition formed to the desired slope, then desirably the composition is heated at temperatures above 100° C. to cure it after a period of time varying from 30 minutes to 2 hours or more to a heat curable silicone rubber elastomer. It should be noted that there may be utilized a post bake cycle if necessary. There may be utilized varies types such as hot air vulcanization.

It is not meant to delete or not include within the present use compositions which do not include curing catalyst therein but the composition is claimed with a curing catalyst since the composition can only be formed to silicone elastomer with a curing catalyst in it and upon being heated at temperatures preferably above 100° C. However, the composition can be sold without a curing catalyst in it and a fabricator can incorporate the curing catalyst and the composition.

In addition the filler does not necessarily have to be incorporated into the composition to form a silicone elastomer. However filler and preferably silica filler is incorporated in the composition to give it the high strength properties that are desired. In addition even beyond the addition of the filler there results in the present composition the additional enhanced physical properties as a result of the blend of vinyl polymers.

It should be noted that also too much filler cannot be incorporated into the composition otherwise too much structuring takes place as one result and the composition starts to crumble when too much filler is incorporated into it is another result.

The examples below are given for the purpose of illustrating the present invention. They are not given for any purpose of setting limits and boundaries to the present invention. All parts in the examples are by weight.

EXAMPLE 1

A vinyl terminated polymer which contains less than 0.73 mole percent 3,3-difluoro-2-propenyl unsaturation and composed of methyltrifluoropropylsiloxy units is considered to be base or polymer A. Said homopolymer has a viscosity of 180 million centipoise at 25° C.

The additive vinyl polymer which is also vinyl terminated and had 0.3 mole percent methyl-vinylsiloxy units derived from the copolymerization involving 1,3,5-trimethyl-1,3,5-trivinylcyclotrisiloxane, had a viscosity of 250 million centipoise at 25° C. This polymer will be referred to as B.

The base polymer A and the additive polymer B were blended to provide a series of blends wherein the overall vinyl levels varied from 0.06 to 0.24 mole percent vinyl on chain. The blends were then compounded; there was added 23 parts of fumed silica filler which was treated with 1,1,3,3,5,5,7,7-octamethylcyclotetrasiloxane, process aids, and 1.5 parts of a curing catalyst which was 2,5-dimethyl-2,5-di(t-butylperoxy)hexane. The compounds were cut into sheets and heated to a temperature of 177° C. for 15 minutes then post baked for 4 hours at 205° C. to provide cured silicone elastomers. The following process aids were utilized:

5-7 parts of a silanol terminated dimethylpolysiloxane of a viscosity varying from 50-60 centipoise at 25° C. and a silanol content of at least 6 percent by weight;

3-5 parts of vinyl-on-chain dimethyl polysiloxane gum of a viscosity of 5,000,000 centipoise at 25° C. and 13.5 mole percent of methyl, vinyl siloxy units.

There was also present 0.25-0.5 parts of rare earth octoate as a heat stabilizer.

The physical properties of these cured compositions are as follows:

| COMPOUNDS | C | D | E | F | G | CONTROL[1] |
|---|---|---|---|---|---|---|
| Parts Polymer A | 100 | 80 | 50 | 20 | 0 | — |
| Parts Polymer B | 0 | 20 | 50 | 80 | 100 | — |
| Mole percent voc* | 0.0 | 0.06 | 0.15 | 0.24 | 0.30 | 0.50 |
| Hardnes Shore A | 38 | 40 | 41 | 41 | 44 | 44 |
| Tensile, psi | 1440 | 1340 | 1160 | 1190 | 1070 | 880 |
| Elongation, % | 750 | 650 | 550 | 480 | 400 | 430 |
| Tear,Die B,ppi[2] | 147 | 110 | 105 | 70 | 60 | 60 |
| Comp. Set, 22 hr/749° C.[3] | 23 | 19 | 18 | 17 | 15 | 26 |
| Vol. Swell in Ethyl Acetate, % | 288 | 273 | 252 | 237 | 229 | 235 |

*VOC refers to vinyl-on chain
[1]Control polymer, silanol terminated polymer which contains 0.5 mole percent vinyl-on-chain and has a viscosity of 260 million centipoise at 25° C.
[2]Tear resistance (lbs/in), Die "B", ASTM method D-624.
[3]Compression set (%), method B, ASTM method D-395.

The material made from the compositions of the present invention had a marked increase in resistance to compression set, they were better by 30-50 percent from the known composition. The tensile strength improved by as much as 20-50 percent. The resistance to tear improved by as much as 75 percent, and the elongation improved by as much as 10-50 percent. Other examples which illustrate this improvement are as follows:

EXAMPLE 2

A vinyl terminated polymer similar to Polymer A in Example 1 but with a viscosity of 260 million centipoise at 25° C. called Polymer H; and a polymer similar to B in said Example 1 but with a viscosity of 260 million centipoise at 25° C. called Polymer I were blended together. The blend and the control referred to as Composition J were compounded for maximum tear resistance and the properties measured. The compounds were catalyzed with 1.5 parts of 2,5-dimethyl-2,5-di (t-butylperoxy) hexane, cut into sheets and heated to a temperature of 177° C. for 10 minutes then post baked for 4 hours at 205° C. to provide cured silicone elastomers. The physical properties of the cured compositions are as follows:

| FORMULATION | | |
|---|---|---|
| | | CONTROL |
| Polymer[1] | — | 100 |
| Polymer H | 80 | — |
| Polymer I | 20 | — |
| Solid Process Aid[2] | 4 | 5 |
| Liquid Process Aid[3] | 3 | 4 |
| Fumed Silica | 9 | 12 |
| Fumed Silica[4] | 21 | 14 |

[1]Same polymer is in Control of Example 1.
[2]High vinyl-on-chain gum process aid of Example 1.
[3]Silanol terminated dimethylpolysiloxane process aid defined in Example 1.
[4]Fumed silica filler treated with 1,1,3,3,5,5,7,7-Octamethylcyclotetrasiloxane

| Compound | J | CONTROL |
|---|---|---|
| Mole percent VOC | 0.3 | 0.5 |
| Hardness Shore A | 55 | 59 |
| Tensile, psi | 1360 | 1180 |
| Elongation, % | 550 | 390 |
| Tear, Die B, ppi | 215 | 128 |

I claim:

1. A high strength heat curable silicone rubber composition comprising (A) 100 parts by weight of vinyl-terminated diorganopolysiloxane base polymer having a viscosity varying from 1,000,000 to 300,000,000 centipoise at 25° C. where the organo groups are selected from a mixture of fluoroalkyl groups and monovalent hydrocarbon radicals wherein the aliphatic type unsaturation on the polymer is 0.7 weight percent or less; (B) from 5 to 80 parts by weight of vinyl-terminated diorganopolysiloxane additive polymer having a viscosity varying from 1,000,000 to 300,000,000 centipoise at 25° C. where the organo groups are a mixture of fluoroalkyl radicals and monovalent hyrocarbon radicals wherein the vinyl-on chain content of the additive polymer varies from 0.05 to 10 mole percent of organo, vinyl siloxy units and (C) from 0.1 to 10 parts of a curing catalyst.

2. The composition of claim 1 wherein the curing catalyst is an organic peroxide.

3. The composition of claim 2 wherein there is present from 5 to 30 parts by weight of a filler.

4. The composition of claim 3 wherein the filler is selected from the class consisting of fumed silica and percipitated silica and mixtures thereof.

5. The composition of claim 4 wherein the filler is treated with a fluorosilazane compound.

6. The composition of claim 4 wherein there is present from 2 to 30 parts by weight of a process aid.

7. The composition of claim 6 wherein the process aid is a non-halogenated compound which is diorganopolysiloxane having a viscosity varying from 100,000 to 10,000,000 centipoise at 25° C. wherein the organo groups are selected from alkyl radicals, vinyl radicals, phenyl radicals and mixtures thereof and in which the vinyl concentration varies from 5 to 25 weight percent.

8. The composition of claim 7 wherein the process aid is a non-halogenated polysiloxane compound of $R_2SiO$ and $RSiO_{1.5}$ units and having a viscosity in the range of 5 to 10,000 centipoise at 25° C. and a silanol content varying from 0.1 to 5 percent by weight where R is selected from the class consisting of alkyl radicals of 1 to 3 carbon atoms, phenyl, vinyl and mixtures thereof.

9. The composition of claim 6 wherein there is present from 0.25 to 10 parts by weight of a self-bonding additive.

10. The composition of claim 6 wherein the self-bonding additive is selected from the class consisting of silyl maleates, silyl fumerates, silyl phthalates, silyl isocyanurates, silyl cyanurates and mixtures thereof.

11. The composition of claim 1 wherein the base polymer has the formula,

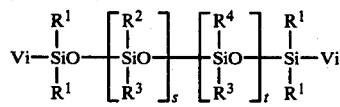

wherein Vi is vinyl, $R^2$ is fluoroalkyl of 3 to 8 carbon atoms, $R^1$, $R^3$ are monovalent hydrocarbon radicals, $R^4$ is selected from the class consisting of fluoroalkyl radicals and monovalent hydrocarbon radicals and s and t varies such that the base polymer has a viscosity varying from 15,000,000 to 300,000,000 centipoise at 25° C. and wherein the aliphatic type unsaturation on-chain is 0.7 weight percent or less.

12. The composition of claim 11 wherein said t varies such that fluoroalkyl substituted group concentration varies from 5 to 80 mole percent.

13. The composition of claim 12 wherein the base polymer contains less than 0.01 percent by weight of silanol groups.

14. The composition of claim 1 wherein the base polymer is a homopolymer with 50 mole percent of fluoroalkyl groups.

15. The composition of claim 1 wherein the additive polymer has the formula,

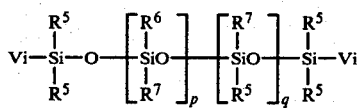

where Vi is vinyl, $R^5$ is a monovalent hydrocarbon radical, $R^6$ is a fluoroalkyl radical of 3 to 8 carbon atoms, $R^7$ is selected from the class consisting of alkyl radicals and phenyl and p and q vary such that the viscosity of the polymer varies from 15,000,000 to 300,000,000 centipoise at 25° C.

16. The composition of claim 15 wherein p and q vary such that the vinyl on chain varies such that the concentration of units taken q times varies from 0.3 to 7 mole percent.

17. The composition of claim 16 wherein the additive polymer contains less than 0.01 weight percent silanol groups.

18. A process for forming a high strength heat curable silicone rubber composition comprising (1) mixing (A) 100 parts by weight of vinyl-terminated diorganopolysiloxane base polymer having a viscosity varying from 1,000,000,000 to 300,000,000 centipoise at 25° C. where the organo groups are selected from a mixture of fluoroalkyl groups and monovalent hydrocarbon radicals wherein the aliphatic unsaturation of the polymer is 0.7 weight percent or less; (B) from 5 to 80 parts by weight of vinyl-terminated diorganopolysiloxane additive polymer having a viscosity varying from 1,000,000 to 300,000,000 centipoise at 25° C. where the organo groups are a mixture of fluoroalkyl radicals and monovalent hydrocarbon radicals wherein the vinyl-on-chain content of the additive polymer varies from 0.05 to 10 mole percent of organo vinyl siloxy units (C) from 0.1 to 10 parts by weight of a curing catalyst and (2) heating the composition at temperatures above 100° C. to form a silicone elastomer.

19. The process of claim 18 wherein the curing catalyst is an organic peroxide.

20. The process of claim 19 wherein there is present 5 to 200 parts by weight of a filler.

21. The process of claim 19 wherein the filler is selected from the class consisting of fumed silica and percipitated silica and mixtures thereof.

22. The process of claim 21 wherein the filler is treated with a fluorosilazane compound.

23. The process of claim 22 where there is present from 2 to 30 parts by weight of a process aid.

24. The process of claim 23 wherein the process aid is a non-halogenated compound which is a diorganopolysiloxane having a viscosity varying from 100,000 to 10,000,000 centipoise at 25° C. wherein the organo groups are selected from alkyl radicals, vinyl radicals, phenyl radicals and mixtures thereof and in which the vinyl concentration varies from 5 to 25 weight percent.

25. The process of claim 23 wherein the process aid is a non-halogenated polysiloxane compound of $R_2SiO$ and $RSiO_{1.5}$ and having a viscosity in the range of 5 to 10,000 centipoise at 25° C. and a silanol content varying from 0.1 to 5 percent by weight where R is selected from the class consisting of alkyl radicals of 1 to 3 carbon atoms, phenyl, vinyl and mixtures thereof.

26. The process of claim 23 wherein there is present from 0.25 to 10 parts by weight of a self-bonding additive.

27. The process of claim 23 wherein the self-bonding additive is selected from the class consisting of silyl maleates, silyl fumerates, silyl phthalates, silyl isocyanurates, silyl cyanurates and mixtures thereof.

28. The process of claim 18 wherein the base polymer has the formula,

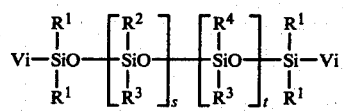

wherein Vi is vinyl, $R^2$ is fluoroalkyl or 3 to 8 carbon atoms, $R^1$, $R^3$ are monovalent hydrocarbon radicals, $R^4$ is selected from the class consisting of fluoroalkyl radicals and monovalent hydrocarbon radicals and s and t vary such that the base polymer has a viscosity varying from 15,000,000 to 300,000,000 centipoise at 25° C. and wherein the aliphatic unsaturated hydrocarbon groups-on-chain is 0.7 weight percent or less.

29. The process of claim 28 wherein s and t varies such that fluoroalkyl substitute group concentration vary from 5 to 80 mole percent.

30. The process of claim 29 wherein the base polymer contains less than 0.01 percent by weight of silanol groups.

31. The process of claim 18 wherein the base polymer is a homopolymer with 50 mole percent of fluoroalkyl groups.

32. The process of claim 18 wherein the additive polymer has the formula,

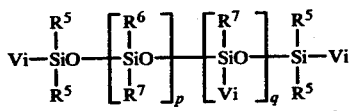

where Vi is vinyl, $R^5$ is a monovalent hydrocarbon radical, $R^6$ is a fluoroalkyl radical of 3 to 8 carbon atoms, $R^7$ is selected from the class consisting of alkyl radicals and phenyl and p and q vary such that the viscosity of the polymer varies from 15,000,000 to 300,000,000 centipoise at 25° C.

33. The process of claim 32 wherein p and q vary such that the vinyl on chain-on-chain varies such that the the concentration of units taken q times varies from 0.3 to 7 mole percent.

34. The process of claim 33 wherein the additive polymer contains less than 0.01 weight percent silanol groups.

35. The composition of claim 1 wherein the curing catalyst is electromagnetic radiation.

* * * * *